US010068237B2

(12) United States Patent
Simske et al.

(10) Patent No.: US 10,068,237 B2
(45) Date of Patent: Sep. 4, 2018

(54) TRANSMIT AN AUTHENTICATION MARK

(71) Applicant: Hewlett-Packard Development Company, L.P., Houston, TX (US)

(72) Inventors: Steven J Simske, Ft. Collins, CO (US); Mark Jacobsen, Galway (IE); Gary Moloney, Galway (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/329,999

(22) PCT Filed: Jul. 29, 2014

(86) PCT No.: PCT/US2014/048570
§ 371 (c)(1),
(2) Date: Jan. 27, 2017

(87) PCT Pub. No.: WO2016/018244
PCT Pub. Date: Feb. 4, 2016

(65) Prior Publication Data
US 2017/0262861 A1 Sep. 14, 2017

(51) Int. Cl.
*G06K 19/06* (2006.01)
*G06Q 30/00* (2012.01)
*G06K 19/10* (2006.01)
*G06K 7/14* (2006.01)

(52) U.S. Cl.
CPC ......... *G06Q 30/0185* (2013.01); *G06K 19/10* (2013.01); *G06K 7/1417* (2013.01)

(58) Field of Classification Search
CPC ... G06K 19/10; G06K 7/1417; G06Q 30/0185

USPC .......................................................... 235/494
See application file for complete search history.

(56) References Cited

U.S. PATENT DOCUMENTS

| 6,069,955 | A * | 5/2000 | Coppersmith | G06Q 10/087 380/200 |
| 7,686,231 | B2 * | 3/2010 | Hamilton | G06F 19/3456 235/375 |
| 8,348,146 | B1 * | 1/2013 | Aurich | G06Q 10/0875 235/375 |
| 8,587,436 | B2 | 11/2013 | Martinez de Belasco Cortina et al. | |
| 2003/0141358 | A1 * | 7/2003 | Hudson | G06K 19/06028 235/375 |

(Continued)

FOREIGN PATENT DOCUMENTS

JP H06-126052 5/1994
JP 2005-208951 8/2005

(Continued)

OTHER PUBLICATIONS

"Understanding Secure ID Card Printing" Mar. 7, 2007.

*Primary Examiner* — Claude J Brown
(74) *Attorney, Agent, or Firm* — HP Inc. Patent Department

(57) ABSTRACT

Examples disclosed herein relate to transmitting an authentication mark. For example, a processor creates an authentication mark for a two factor authentication system. The authentication mark is created according to data represented by a data bearing image. The processor transmits via a network the authentication mark to a computing device.

20 Claims, 7 Drawing Sheets

(56) References Cited

U.S. PATENT DOCUMENTS

| | | | |
|---|---|---|---|
| 2005/0199723 A1* | 9/2005 | Lubow | G06K 1/18 235/462.01 |
| 2008/0106371 A1 | 5/2008 | Tseng et al. | |
| 2008/0180751 A1* | 7/2008 | Simske | B41M 3/14 358/3.28 |
| 2011/0211727 A1* | 9/2011 | Costa | G06F 21/35 382/100 |
| 2011/0280480 A1* | 11/2011 | Simske | G06K 9/00442 382/173 |
| 2011/0302089 A1* | 12/2011 | McKenzie | G06Q 20/3274 705/75 |
| 2012/0327450 A1* | 12/2012 | Sagan | G03G 21/046 358/1.14 |
| 2013/0311788 A1 | 1/2013 | Faher et al. | |
| 2014/0105449 A1* | 4/2014 | Caton | G06F 21/34 382/100 |
| 2015/0358164 A1* | 12/2015 | Carter | H04L 9/3226 713/179 |
| 2016/0004955 A1* | 1/2016 | Bourrieres | G06K 19/086 358/3.28 |
| 2016/0055479 A1* | 2/2016 | Tonomura | G06Q 20/0457 705/23 |
| 2016/0196509 A1* | 7/2016 | Whitaker | G06Q 10/02 705/5 |
| 2016/0321531 A1* | 11/2016 | Lau | G06K 19/06037 |
| 2016/0342857 A1* | 11/2016 | Simske | G06K 9/4671 |

FOREIGN PATENT DOCUMENTS

| | | |
|---|---|---|
| JP | 2008-515741 | 5/2008 |
| JP | 2008-542916 | 11/2008 |
| JP | 2008-301486 | 12/2008 |
| JP | 2009-032070 | 2/2009 |
| JP | 2009-111869 A | 5/2009 |
| KR | 10-0769215 B1 | 10/2007 |
| KR | 10-2013-0078842 A | 7/2013 |
| KR | 10-2014-0087084 A | 7/2014 |
| WO | WO-2008017300 A2 | 2/2008 |
| WO | WO-2008071634 A1 | 6/2008 |
| WO | WO-2013064210 A1 | 5/2013 |

* cited by examiner

TRANSMIT AN AUTHENTICATION MARK

BACKGROUND

Authentication information may be printed on packages to prevent counterfeiting. A barcode printed on a product package may include information that may be verified to determine the authenticity of the product. For example, the barcode may represent a binary string indicating a serialization number or other information related to the product.

BRIEF DESCRIPTION OF THE DRAWINGS

The drawings describe example embodiments. The following detailed description references the drawings, wherein.

DETAILED DESCRIPTION

In one implementation, a processor creates an authentication mark for a two factor authentication system. The authentication mark may be created according to data represented by a data bearing image. The processor may transmit via a network the authentication mark to a computing device. For example, an authentication service may be provided to create and verify the authentication mark.

As an example, a cloud service, or other distributed/networked service, may be used to generate a data bearing image and authentication mark to be printed on a package. A user in possession of a package may use a mobile device to capture an image of a data bearing image printed on the package. Information related to the data bearing image may be transmitted to the cloud service. The cloud service creates an authentication mark based on the received information related to the data bearing image and transmits the authentication mark to the mobile device. A user may compare the received authentication mark displayed on the mobile device to an authentication mark printed on the package. If the two do not match or otherwise correlate, counterfeiting may be suspected. The confirmation may be performed by a person in the supply chain and/or an end purchaser wanting to confirm that they received a genuine product.

The authentication mark may be created from the data bearing image in any suitable manner. In one implementation, the authentication mark is a standalone guilloche image that is created from a 64 bit data string such that there are $2^{64}$ possible unique instantiations of the authentication guilloche. Properties such as the color, curvature, size, angle, border, and other properties may be determined based on a data string associated with the data bearing image.

A two factor authentication system based on two related images forces a potential counterfeiter to be able to replicate the system for creating the related images to avoid being flagged as a counterfeit product. In addition, using an image based authentication system may be paired with other marketing strategies by allowing the user to become part of the authentication process. For example, the authentication mark may be a visually pleasing image displaying information about a brand, such as a logo or other information.

Figure 1:
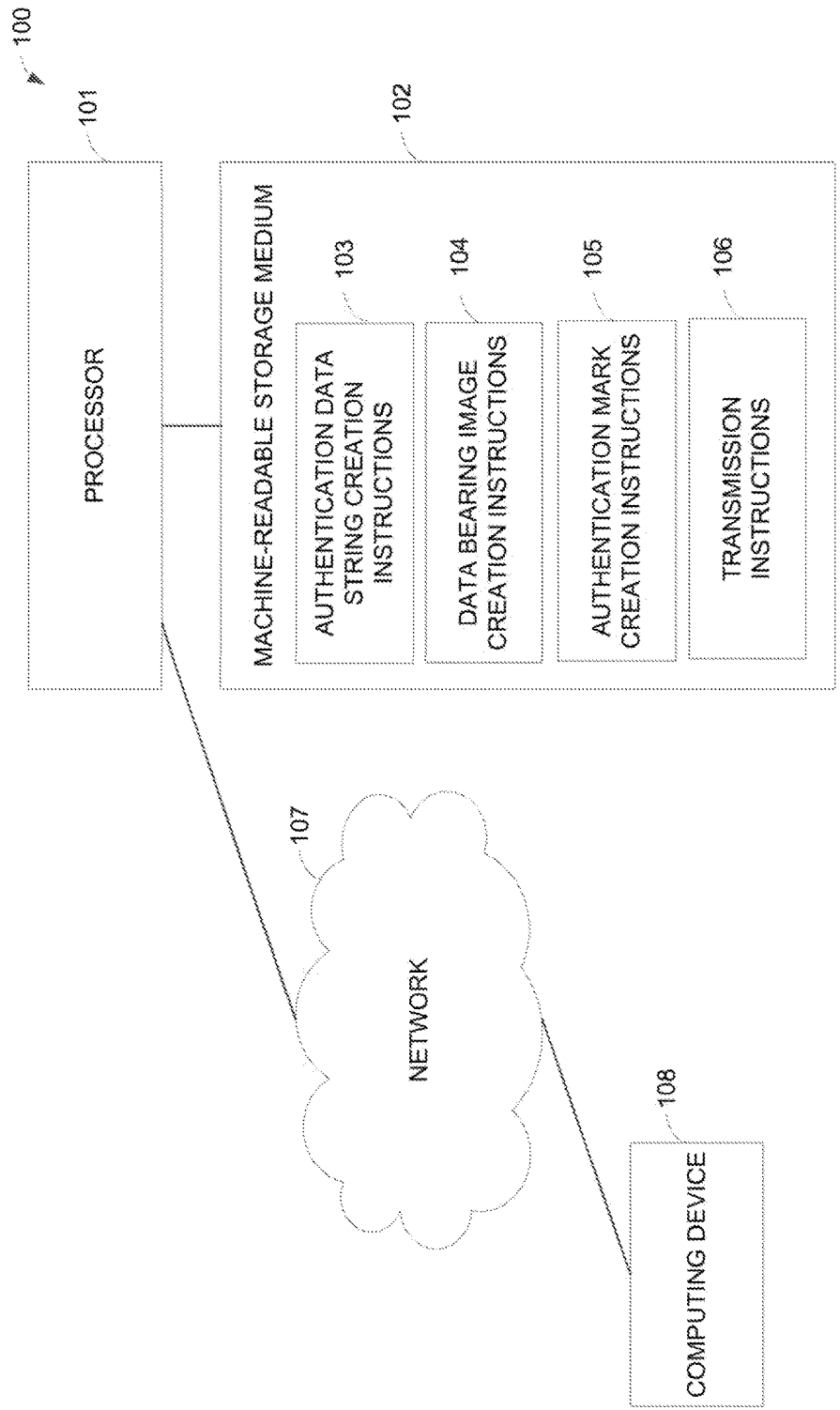
FIG. 1 is a block diagram illustrating one example of computing system to transmit an authentication mark to be associated with an item.

FIG. 1 is a block diagram illustrating one example of computing system 100 to transmit an authentication mark to be associated with an item. For example, the computing system 100 may create a data bearing image and authentication mark such that the authentication mark may be replicated based on information associated with the data bearing image. The computing system 100 may be used to output the data bearing image and the authentication mark on a surface used for authentication, such as on a package or label.

The computing system 100 includes a processor 101, a machine-readable storage medium 102, a network 107, and a computing device 108. The network 107 may be any suitable network for communicating information. The network 107 may be, for example, the Internet. The network 107 may be used to communicate between the processor 101 and the computing device 108, The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The computing device 108 may be any suitable computing device to output information received from the processor 101. For example, the computing device 108 may be a device for printing information. The computing device 108 may be a printer or a computing device for transmitting information to a printer to print. In one implementation, the computing device 108 is used to print information on a surface used for authentication, such as on a package, label, or document. For example, the computing device 108 may be part of a supply chain of a product authenticated using a two factor data bearing image and authentication mark system. The computing device 108 may print on paper or electronic paper. For example, the computing device 108 may output information to active or passive electronic paper.

In one implementation, two computing devices are used where a first computing device receives the data bearing image to output and a second computing device receives the authentication mark to output, such as where the data bearing image is printed on a paper label and the authentication mark is output to electronic paper.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include authentication data string creation instructions 103, data bearing image creation instructions 104, authentication mark creation instructions 105, and transmission instructions 106.

The authentication data string creation instructions 103 include instructions to create a data string for authentication. The data string may be unique to a company, product type, and/or product. For example, the data string may include serialization information, such as a unique ID associated with each item being serialized. In one implementation, different bits within the data string represent different types of information, such as a set of bits for the producer and a set of bits for serialization for the particular product. In one implementation, processing is performed on a selected data string, such as to encrypt an initial data string.

The data bearing image creation instructions 104 includes instructions to create a data bearing image to indicate the authentication data string. The data bearing image may be, for example, a barcode or QR code.

The authentication mark creation instructions 105 includes instructions to create an authentication mark related to the data bearing image, such as based on the authentication data string. The authentication mark may any suitable mark used for authentication, such as a visual or auditory mark. For example, the authentication mark may be a guilloche, such as a standalone guilloche, a grid code, and/or halftone image. The properties of the authentication mark may be determined based on the authentication data string. For example, the color, size, border, angle, shape, and other properties may be determined based on the data string.

The transmission instructions 106 include instructions to transmit the data bearing image and the authentication mark via the network 107, such as to the computing device 108. For example, the computing device 108 may receive the data bearing image and the authentication mark and cause the data bearing image and the authentication mark to be printed, such as on product packaging.

Figure 2:
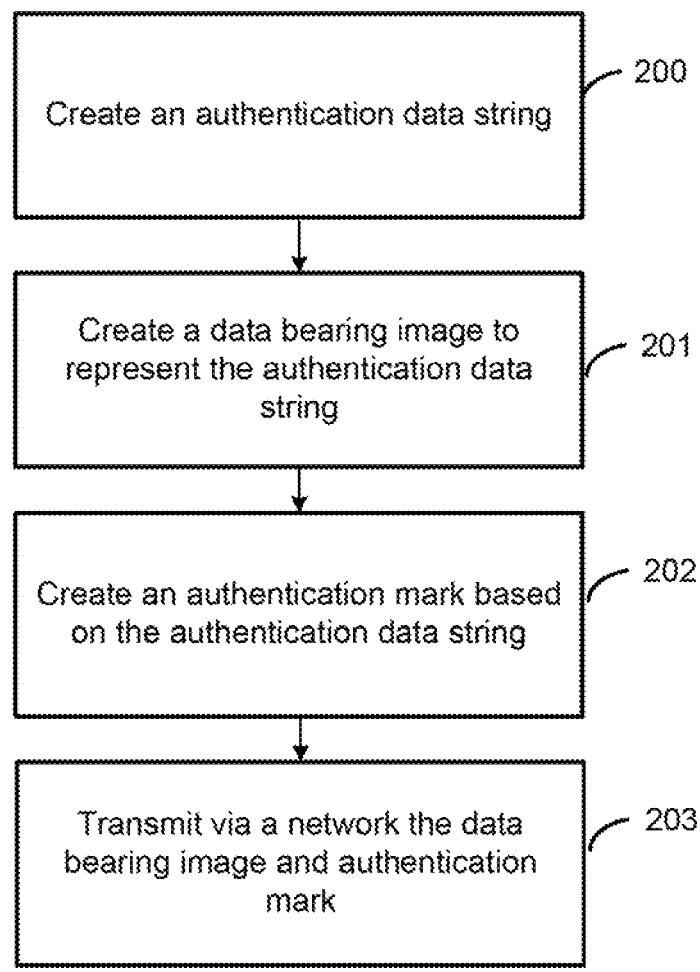
FIG. 2 is a flow chart illustrating one example of a method to transmit an authentication mark to be associated with an item.

FIG. 2 is a flow chart illustrating one example of a method to transmit an authentication mark to be associated with an item. For example, a processor may create an authentication mark and a data bearing image such that the data bearing image includes data related to instructions for creating the authentication mark. If an authentication mark is created based on the data bearing image that does correspond to the associated authentication mark, the processor may provide an indication that counterfeiting is suspected. The method may be implemented, for example, by the processor 101 of FIG. 1.

Beginning at 200, a processor creates an authentication data string. The authentication data string may be generated based on a random number generator. The data string may be related to a previously generated serialization number. The data string may include information related to a product or object to be associated with a data string, such as information related to the source or product type. The data string may be, for example, a binary string. In one implementation, the data string is a hexadecimal string.

Continuing to 201, a processor creates a data bearing image to represent the authentication data string. For example, the authentication data string may be used to create a barcode, such as a 2D or 3D barcode. The barcode may be used for multiple purposes, such as to create an authentication mark and to identify a product. For example, the barcode may be scanned at different points in a supply chain to track the movement of a product associated with the barcode.

Continuing to 202, a processor creates an authentication mark based on the authentication data string. The authentication mark may be any suitable mark used for authentication, such as an audio or visual mark, where the properties may be determined based on the authentication data string. The authentication mark may be, for example, a guilloche, halftone, or grid code. The guilloche may be a standalone guilloche. The authentication mark may be a visual mark suitable for printing on any suitable medium, such as on paper or electronic paper. The authentication mark may be small in size, such as to fit on a label a long side a data bearing image. For example, the authentication mark may be less than 0.5×0.5 inches at 812.8 dpi.

The processor may determine the properties of the authentication mark based on the authentication data string. For example, the color, shape, size, curvature angle, number of curves, orientation, and border may be determined based on the authentication data string. In one implementation, the authentication mark is a guilloche with the curve properties, such as the spacing between curves, curve thicknesses, curve families, angles, curve set size, and x and y offset of the curve sets, determined based on the authentication data string.

The authentication mark may be created based on the authentication data string in any suitable manner. For example, different portions of the authentication data string may related to different properties, such as where bits three through five relate to color, and the value of the bits indicate the color of the authentication mark. In some cases, the portions of the authentication data string are related, such as where a first bit indicates whether there is a border and a second set of bits indicates the thickness of the border if the presence of a border is indicated. In some implementations, the authentication data string may be different sizes such that an authentication mark may be created from different string lengths. In one implementation, a guilloche authentication is generated based on an authentication data string based on methods described in U.S. Pat. No. 8,289,579 "Variable Guilloche and Method" to Simske, et al., herein incorporated by reference in its entirety.

The authentication mark may be created in a visually appealing manner, such as to appear in the shape of a logo. Some properties of the authentication mark may appear the same regardless of different authentication data strings, such as where the authentication mark is in the shape of a logo, but the orientation, color, and other properties vary according to the authentication data string.

In one implementation, the processor creates the authentication mark based on the authentication data string and additional information. The processor may look up information based on the contents of the authentication data string to determine information about how to, create the authentication mark. The processor may perform some processing on the authentication data string such as decrypting the data string, prior to creating the authentication mark to obfuscate the relationship between the authentication mark and the authentication data string associated with the data bearing image. For example, a XOR operation may be performed on the authentication data string with a random bit stream generated by the processor.

In one implementation, multiple authentication marks are created, such as where the authentication data string is used to create multiple marks to be associated with the data bearing image, For example, for a 192 bit authentication data string, the processor may create three 64 bit authentication marks, such as three guilloche images to be printed on a row on packaging.

The relationship between the authentication data string and the authentication mark may vary. The variation may be used to prevent a counterfeiter from being able to replicate a large set of authentication data string and authentication mark pairs when one relationship between an authentication data string and authentication mark has been compromised. For example, the relationship may vary by any suitable grouping, such as by selling company, SKU, product, brand, and/or product lot. Information about the particular relationship may be determined based on information stored in a database. For example, the processor may look up information in a database related to the authentication data string and/or other identifying information, such as product SKU, determine the relationship between the authentication mark and the authentication data string Continuing to 203, a processor transmits via a network the data bearing image and authentication mark. The processor may transmit the data bearing image and the authentication mark to a printing computing device, such as a printer or a server for distributing print jobs. In one implementation, the processor transmits the data bearing image to a first computing device and the authentication mark to a second computing device. The data bearing image and the authentication mark may be output to any location/object to which a package maybe associated where access may be given to someone with ownership or possession of the package. For example, the data bearing image and the authentication mark may be printed on the same packaging or different parts of packaging associated with a product, such as barcode on a product box and an authentication mark printed on a paper included within the product box.

Figure 3:
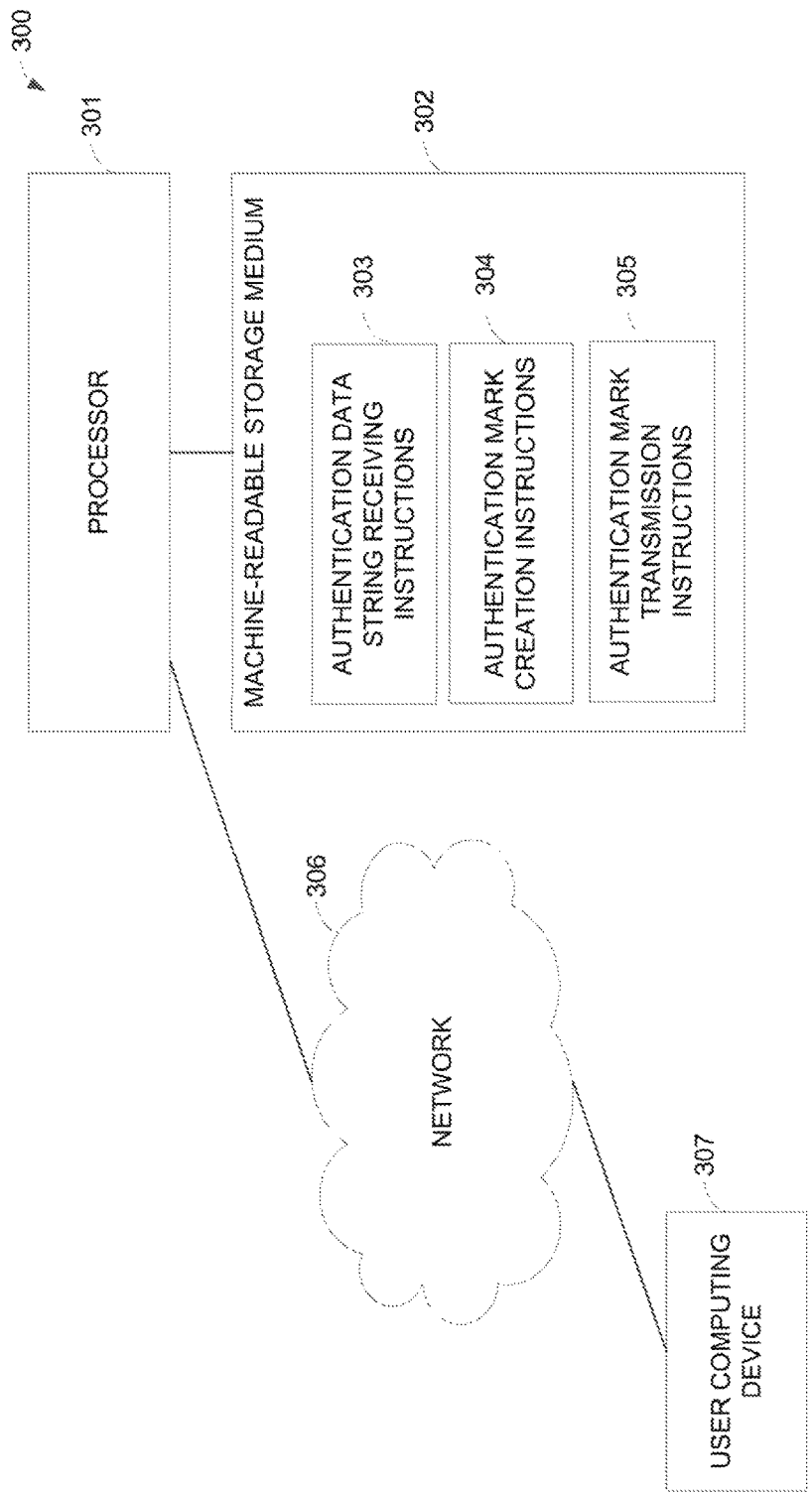
FIG. 3 is a block diagram illustrating one example of a computing system to transmit an authentication mark to a user computing device.

FIG. 3 is a block diagram illustrating one example of a computing system 300 to transmit an authentication mark to a user computing device. For example, the computing system 300 may be used to create an authentication mark based on a data bearing image and transmit the created authentication mark to a user computing device for verification. The computing system 300 includes a processor 301, a machine-readable storage medium 302, a network 306, and a user computing device 307.

The processor 301 may be a central processing unit (CPU), a semiconductor-based microprocessor, or any other device suitable for retrieval and execution of instructions. As an alternative or in addition to fetching, decoding, and executing instructions, the processor 301 may include one or more integrated circuits (ICs) or other electronic circuits that comprise a plurality of electronic components for performing the functionality described below. The functionality described below may be performed by multiple processors.

The user computing device 307 may be any suitable personal computing device, such as a notebook, mobile phone, or slate computer. The user computing device 307 may include network capabilities, a camera, and a display.

The network 306 may be any suitable network for communicating information. The network 306 may be, for example, the Internet. The network 306 may be used to communicate between the processor 301 and the user computing device 307.

The processor 301 may communicate with the machine-readable storage medium 302. The machine-readable storage medium 302 may be any suitable machine readable medium, such as an electronic, magnetic, optical, or other physical storage device that stores executable instructions or other data (e.g., a hard disk drive, random access memory, flash memory, etc.). The machine-readable storage medium 302 may be, for example, a computer readable non-transitory medium. The machine-readable storage medium 302 may include authentication data string receiving instructions 303, authentication mark creation instructions 304, and authentication mark transmission instructions 305.

The authentication data string receiving instructions 303 include instructions to receive an authentication data string from the user computing device 307. The authentication data string may be received from the user computing device 307 or an intermediary device between the user computing device 307 and the processor 301. In one implementation, the user computing device 307 includes a camera to capture a data bearing image. The user computing device 307 may interpret the data bearing image to determine the authentication data string and/or send information about the data bearing image to another computing device to determine an authentication data string from the data bearing image. The data bearing image may be an image with fiducial information to indicate the position of the data bearing image. The data bearing image may be, for example, a QR code or barcode. The authentication data string may be any suitable string of information, such as a binary or hexadecimal string.

The authentication mark creation instructions 304 includes instructions to create an authentication mark based on the received authentication data string. For example, the entire authentication data string or a subset of the authentication data string may indicate how to create the authentication mark, such as indicating the color, shape, size, curvature angle, number of curves, orientation, and border of the authentication mark.

In one implementation, additional information is used to create the authentication mark in addition to the contents of the authentication data string. For example, the authentication data string may include information about the authentication mark and information about a client associated with data mark. The computing system 300 may include a storage to store authentication data associated with a plurality of clients. The processor 301 may look up information related to a client in a storage and use the information to alter the authentication mark. The authentication mark may be, for example, a grid code, halftone, or guilloche. The guilloche may be a standalone guilloche used as the authentication mark itself as opposed to as a background image.

The authentication mark transmission instructions 305 include instructions to transmit the authentication mark via the network 306 to the user computing device 307. The user computing device 307 may display the authentication mark on a display associated with the user computing device 307. A user may compare the received authentication mark displayed on the user computing device 307 to a printed authentication mark, such as an authentication mark printed on packaging. The user may indicate information about suspected counterfeiting into a user interface associated with the user computing device 307, and the information may be transmitted to the processor 301 via the network 306.

Figure 4:
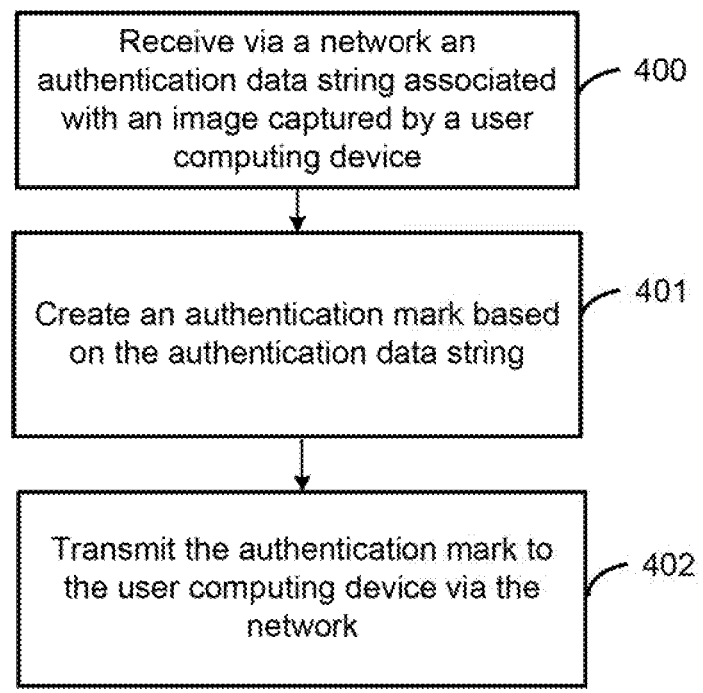
FIG. 4 is a flow chart illustrating one example of a method to transmit an authentication mark to a user computing device.

FIG. 4 is a flow chart illustrating one example of a method to transmit an authentication mark to a user computing device. For example, a processor may create an authentication mark based on information determined from a data bearing image. The created authentication mark may be transmitted to a user device to be displayed. A user may compare the displayed authentication mark to a printed authentication mark to verify the authenticity of a product. For example, the interaction may be used to both promote brand loyalty, brand interaction, and counterfeit preventention. The method may be implemented, for example, by the processor 301 of FIG. 3.

Beginning at 400, a processor receives via a network an authentication data string associated with an image captured by a user computing device. The processor may receive an authentication data string directly or may receive a data bearing image, such as a barcode or QR code, representing the authentication data string. In one implementation, a user computing device captures an image of a data bearing image and determines an authentication data string based on the data bearing image. The user computing device may transmit the data bearing image to a cloud service to interpret the data bearing image, receive the authentication data string associated with the data bearing image from the interpreting cloud service, and transmit the authentication data string to the processor to create an authentication mark based on the authentication data string.

Continuing to 401, a processor creates an authentication mark based on the authentication data string. For example, the processor may perform a similar process as described above in relation to block 202 of FIG. 2 such that the same authentication mark results from the same authentication data string whether creating to transmit to print or creating to transmit to display. In one implementation, the method is not symmetrical, such as where a printed authentication mark is placed on packaging and the authentication mark sent to the user device for verification is an audio mark indicating information related to the printed information package.

The authentication mark may be any suitable authentication indicator, such as a visual or audio mark. For example, the processor may create a guilloche, halftone, or grid code based on the authentication data string. The authentication mark may be a standalone guilloche.

The processor may determine any suitable information related to the authentication mark based on the authentication data string. For example, the processor may determine a color, shape, size, curvature angle, number of curves, orientation, and border of the authentication mark based on the authentication data string.

In one implementation, the processor performs preprocessing on the authentication data string prior to creating the authentication mark. For example, the processor may decrypt the authentication data string. The processor may communicate with a storage to determine additional information for creating the authentication mark, such as where the relationship between the authentication data string and authentication mark vary based on stored information. For example, a storage may store authentication data related to a plurality of clients, and the processor may create an authentication mark based on the authentication data string and stored information looked up based on information within the authentication data string. The processor may look up information in a database related selling company, SKU, product, brand, and/or product lot to determine the relationship between the authentication data string and the authentication mark.

In one implementation, additional authentication measures are taken in addition to creating the authentication mark. For example, when creating the authentication mark, the processor may store information related to the authentication mark such that overuse of a particular authentication mark or properties of an authentication mark may indicate that a counterfeit authentication mark is in the system.

Continuing to 402, a processor transmits the authentication mark to the user computing device via the network. The user computing device may make the authentication mark available to a user, such as by displaying a visual authentication mark or playing an audio authentication mark.

In one implementation, a user may compare the received authentication mark to a printed authentication mark, such as an authentication mark printed on paper or electronic paper. The processor may generate a user interface to allow the user to indicate whether the received authentication mark corresponds to the printed authentication mark, such as to indicate that the marks match or a degree of similarity or dissimilarity. The processor may perform an action based on the received user input. For example, an indication that the marks do not match or a degree of similarity below a threshold may cause the processor to take an action to indicate the possibility of counterfeiting.

In one implementation, there are multiple associated authentication marks, such as where there is an authentication mark on a package and associated authentication marks on items within the package. For example, there may be a data bearing image and authentication mark pair on the package and on each item in the package, and the processor may create the authentication marks for the items within the package based on both the data bearing image of the item and the data bearing image associated with the package. In one implementation, the package includes a data bearing image and an authentication mark, and the processor creates multiple authentication marks based on a single data bearing image. In some implementations, some authentication marks are associated with other authentication marks and some are not.

In one implementation, the processor determines additional information based on the authentication data string and transmits the additional information to the user computing device. For example, the processor may transmit for display the authentication mark and an advertisement or offer associated with the product being authenticated.

Figure 5:
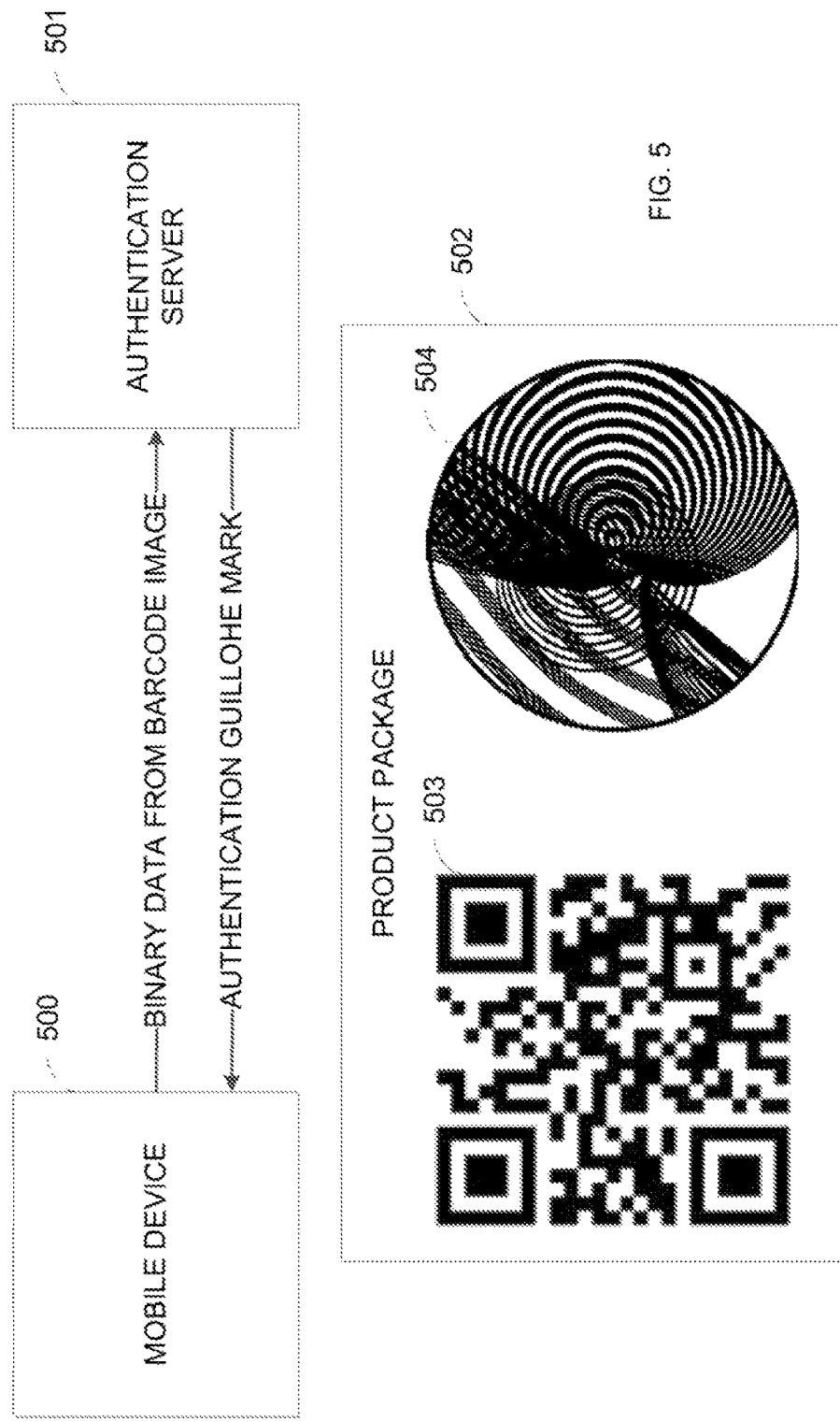
FIG. 5 is a diagram illustrating one examples of an authentication system related to a transmitted authentication mark.

FIG. 5 is a diagram illustrating one example of an authentication system related to a transmitted authentication mark. A mobile device 500 communicates with an authentication server 501 via a network. The communication may relate to a product package 502. The product package may have authentication information printed on. For example, the product package 502 has data bearing image QR code 503 and authentication mark guilloche 504 printed on it. The two may related to each other such that the QR code 503 represents information related to producing the guilloche 504. As an example, the QR code 503 may encode serialization string "1564852349700030" that includes 16 hexadecimal characters, and a processor may translate the 16 hexadecimal characters to a 64 bit binary string (in this case "0001010101100100100001010010001101001001011100 000000000000110000"). The 64 bit binary string may be used to create the guilloche 504 such that the guilloche 504 is unique from guilloche marks created based on different 64 bit binary strings.

The mobile device 500 may capture an image of the product package 502 QR code 503 and transmit binary information related to the QR code 503 and/or an image of the QR code 503 itself to authentication server 501. The authentication server 501 may create an authentication mark guilloche based on the received binary data and transmit the authentication mark guilloche to the mobile device 500. The mobile device 500 may display the authentication mark guilloche, and a user and/or electronic device may compare the received authentication mark guilloche to printed guilloche 504.

Figure 6:
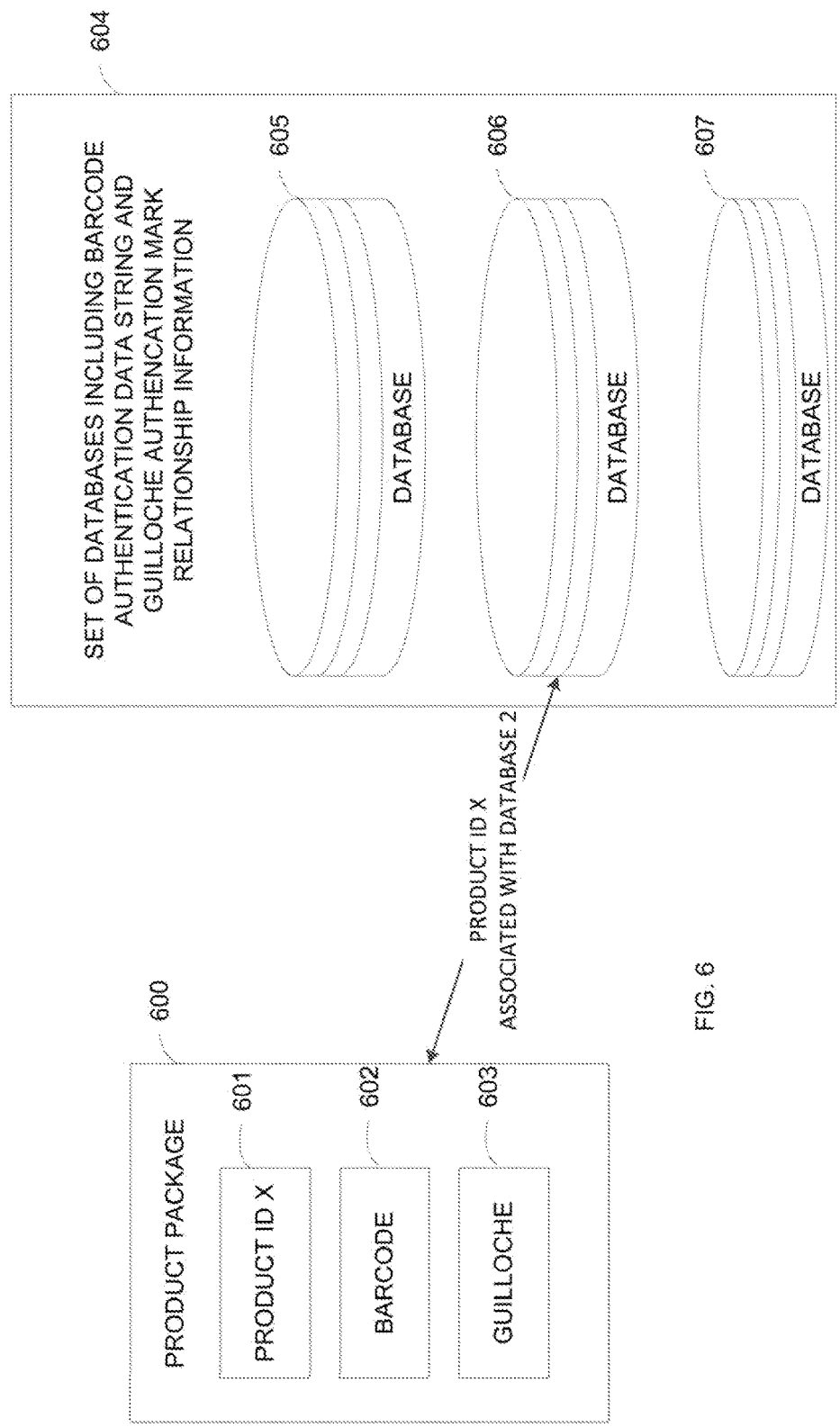
FIG. 6 is a diagram illustrating one example of determining a relationship between an authentication data string and an authentication mark.

FIG. 6 is a diagram illustrating one example of determining a relationship between an authentication data string and an authentication mark. The relationship between an authentication data string and authentication mark may vary, such as based on stored information. The product package 600 includes a product ID 601, barcode 602 to represent an>authentication data string, and a guilloche 603 authentication mark. In one implementation, a processor looks up information indicating a relationship between the authentication data string and authentication mark based on additional information associated with a product package, such as the product ID 601 associated with the product package 600.

The processor may select a database to use to lookup information related to the relationship based on the product ID 601. For example, a set of databases 604 including database 605, database 606, and database 607 may each include information about a relationship between an authentication data string and authentication mark, and a processor may select which database to communicate with based on the product ID 601. In this case, product ID X is associated with database 606. In one implementation, the processor determines a piece of information to use to locate the database from the data bearing image barcode 602 For example, the barcode 602 payload may include both identification and serialization information.

Figure 7:
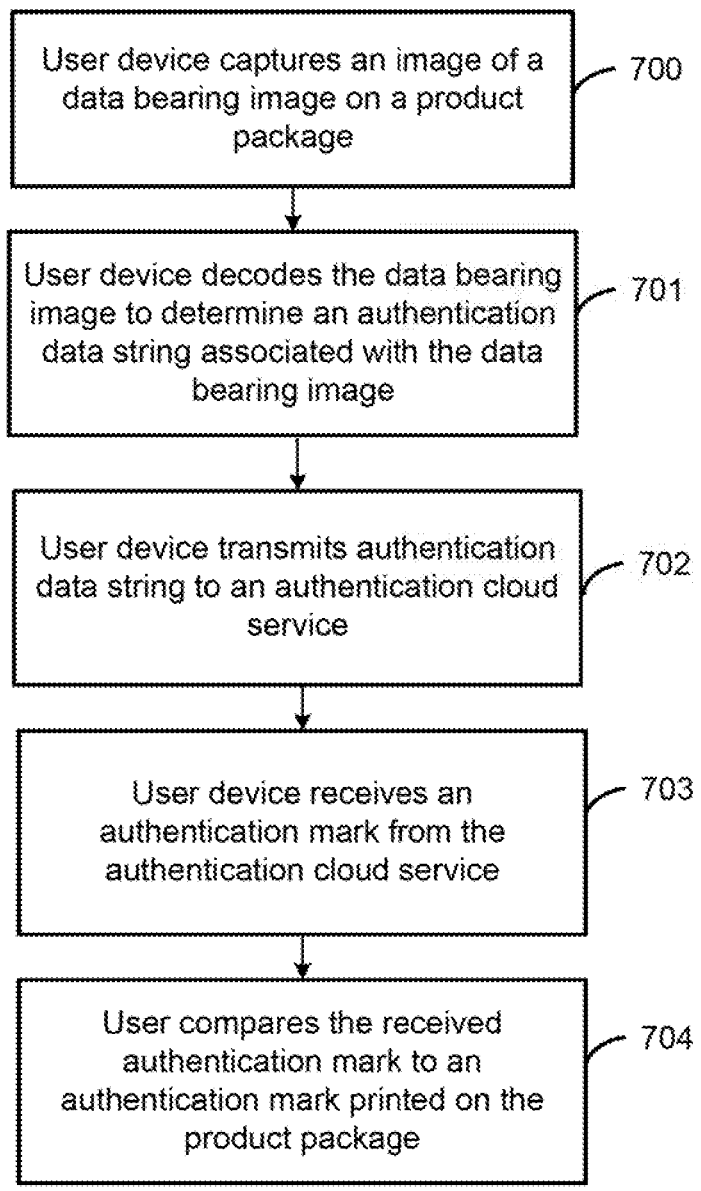
FIG. 7 is a flow chart illustrating one example of a workflow related to a transmitted authentication mark.

FIG. 7 is a flow chart illustrating one example of a workflow related to a transmitted authentication mark. For example, a cloud service may be provided to a user computing device to create an authentication workflow. The user may be, for example, an end user of a product or a worker along a supply chain responsible for identifying suspected counterfeit products.

Beginning at 700, a user device captures an image of a data bearing image on a product package. For example, the user device may be a mobile device with a camera. The camera may be used to capture an image of a barcode or other data bearing image on the product package.

Continuing to 701, the user device decodes the data bearing image to determine an authentication data string associated with the data bearing image. The user device may include instructions located on the user device to decode the data bearing image or may transmit information about the data bearing image to a service for decoding the image.

Continuing to 702, the user device transmits the authentication data string to an authentication cloud service. For example, the user device may transmit the information via the Internet to an authentication server.

Continuing to 703, the user device receives an authentication mark from the authentication cloud service. For example, the authentication cloud service may create the authentication mark based on the received authentication data string and transmit the created authentication mark via the Internet to the user device.

Continuing to 704, a user compares the received authentication mark to an authentication mark printed on the product package. For example, the user may determine if the two marks are similar. If not, the user may provide input to indicate that counterfeiting is suspected. The processor may respond to an input indicating suspected counterfeit by performing a remediation action and/or performing a reporting action.

The two factor authentication cloud service provides a more secure authentication system by forcing a potential counterfeiter to replicate both the data bearing image and the authentication mark. The cloud service also potentially provides an additional method for an entity to interact with customers to promote their brand, such as by creating authentication marks related to a logo or other brand information.

The invention claimed is:

1. A computing system, comprising:
a storage to store authentication data associated with a plurality of clients; and a processor to:
receive via a network a hexadecimal authentication data string associated with an image of a barcode or QR code on a product captured by a user computing device, wherein the hexadecimal authentication data string includes information about a client;
receive stored authentication data related to the client from the storage;
translate the hexadecimal authentication data string to a binary authentication data string using the stored authentication data;
create a guilloche authentication mark for a two factor authentication system based on the binary authentication data string and the stored authentication data, wherein the processor determines curve, color, shape, size, orientation, and border properties of the guilloche authentication mark based on the binary authentication data string and the stored authentication data; and
transmit the guilloche authentication mark to the user computing device via the network for a user to compare a displayed guilloche authentication mark to a printed guilloche authentication mark to verify authenticity of the product.

2. The computing system of claim 1, wherein creating the authentication mark comprises creating multiple authentication marks varying based on the stored authentication data wherein each of the multiple authentication marks comprises at least one of: a guilloche, halftone, and grid code.

3. The computing system of claim 1, wherein the processor is further to:
generate a random bit stream; and
perform an XOR operation on the binary authentication data stream with the random bit stream.

4. The computing system of claim 1, wherein the processor further receives via the network an indication of at least one of:
the transmitted guilloche authentication mark corresponds to a printed image associated with the hexadecimal authentication data string;
the transmitted guilloche authentication mark does not correspond to a printed image associated with the hexadecimal authentication data string.

5. The computing system of claim 4, wherein the processor performs an action based on the received indication.

6. The computing system of claim 1, wherein the processor:
selects an advertisement or offer information based on the hexadecimal authentication data string using the information about the client; and
transmits via the network the selected advertisement or offer information to the user computing device.

7. The computing system of claim 1, wherein the stored authentication data includes at least one of selling company, SKU, product, brand, and product lot.

8. A method, comprising:
creating, by a processor, a hexadecimal authentication data string;
creating a data bearing barcode or QR code image to represent the hexadecimal authentication data string and information about a client;
translating the hexadecimal authentication data string to a binary authentication data string using information about the client;

creating a guilloche authentication mark for a two factor authentication system based on the binary authentication data string and information about the client, including determining curve, color, shape, size, orientation, and border properties of the guilloche authentication mark based on the binary authentication data string and information about the client; and transmitting via a network the data bearing barcode or QR code image and the guilloche authentication mark for both to be printed on a product to allow for authenticity verification of the product.

9. The method of claim 8, wherein creating the guilloche authentication mark to represent the binary authentication data string and information about the client comprises creating multiple authentication marks to represent the binary authentication data string and varying information about the client.

10. The method of claim 8, wherein creating the guilloche authentication mark comprises creating the guilloche authentication mark wherein at least one of: a color, shape, size, curvature angle, number of curves, orientation, and border of the guilloche authentication mark is determined based on the binary authentication data string and information about the client.

11. The method of claim 8, further comprising:
receiving via the network from a user computing device a second hexadecimal authentication data string;
storing information related to the second hexadecimal authentication data;
determining that the second hexadecimal authentication data has not been overused;
if not overused,
creating a second guilloche authentication mark based on the second hexadecimal authentication data string; and
transmitting the second guilloche authentication mark via the network to the user computing device.

12. The method of claim 11, wherein transmitting the guilloche authentication mark to the user computing device comprises transmitting the guilloche authentication mark to a mobile device.

13. The method of claim 8, further comprising:
receiving, by a printer, the transmitted data bearing barcode or QR code image and the guilloche authentication mark; and
printing, by the printer, the data bearing barcode or QR code image and the guilloche authentication mark on a piece of product packaging.

14. The method of claim 8, wherein the information about the client includes at least one of selling company, SKU, product, brand, and product lot.

15. The method of claim 8, further comprising:
selecting an advertisement or offer information based on the hexadecimal authentication data string using the information about the client; and
transmitting via the network the selected advertisement or offer information to a user computing device.

16. A machine-readable non-transitory storage medium comprising instructions executable by a processor to:
receive via a network a hexadecimal authentication data string associated with an image of a barcode or QR code on a product captured by a user computing device, wherein the hexadecimal authentication data string includes information about a client;
receive stored authentication data related to the client from a storage;
translate the hexadecimal authentication data string to a binary authentication data string using the stored authentication data;
create a guilloche authentication mark for a two factor authentication system based on the binary authentication data string and the stored authentication data, wherein curve, color, shape, size, orientation, and border properties of the guilloche authentication mark are created according to data represented by the binary authentication data string and the stored authentication data;
transmit via a network the guilloche authentication mark to the user computing device for a user to compare a displayed guilloche authentication mark to a printed guilloche authentication mark to verify authenticity of the product.

17. The machine-readable non-transitory storage medium of claim 16, wherein the instructions to create the guilloche authentication mark according to the binary authentication data string and the stored authentication data further comprise instructions to create multiple authentication marks according to data represented by at least one of: a barcode and a QR code.

18. The machine-readable non-transitory storage medium of claim 17, wherein instructions to create the multiple authentication marks comprise instructions to create multiple authentication marks wherein each of the multiple authentication marks varies based on the stored authentication data and comprises at least one of: a guilloche, halftone, and grid code.

19. The machine-readable non-transitory storage medium of claim 16 wherein the stored authentication data includes at least one of selling company, SKU, product, brand, and product lot.

20. The machine-readable non-transitory storage medium of claim 16 wherein the instructions further cause the processor to:
select an advertisement or offer information based on the hexadecimal authentication data string using the information about the client; and
transmit via the network the selected advertisement or offer information to the user computing device.

* * * * *

UNITED STATES PATENT AND TRADEMARK OFFICE
CERTIFICATE OF CORRECTION

PATENT NO.         : 10,068,237 B2
APPLICATION NO.    : 15/329999
DATED              : September 4, 2018
INVENTOR(S)        : Steven J Simske et al.

It is certified that error appears in the above-identified patent and that said Letters Patent is hereby corrected as shown below:

On page 2, Column 1, item (56), U.S. Patent Documents, Line 14, delete "1/2013" and insert -- 11/2013 --, therefor.

In sheet 5 of 7, FIG. 5, delete "GUILLOHE" and insert -- GUILLOCHE --, therefor.

In sheet 6 of 7, FIG. 6, reference numeral 604, Line 3, delete "AUTHENCATION" and insert -- AUTHENTICATION --, therefor.

Signed and Sealed this
Twelfth Day of February, 2019

Andrei Iancu
*Director of the United States Patent and Trademark Office*